(12) United States Patent
Ellerbrock

(10) Patent No.: US 7,111,100 B2
(45) Date of Patent: Sep. 19, 2006

(54) SYSTEMS AND METHODS FOR ASSIGNING AN ADDRESS TO A NETWORK DEVICE ADDED TO AN EXISTING NETWORK

(75) Inventor: Philip J. Ellerbrock, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 205 days.

(21) Appl. No.: 10/475,421

(22) PCT Filed: Apr. 26, 2002

(86) PCT No.: PCT/US02/13366

§ 371 (c)(1),
(2), (4) Date: Oct. 21, 2003

(87) PCT Pub. No.: WO02/088967

PCT Pub. Date: Nov. 7, 2002

(65) Prior Publication Data
US 2004/0133721 A1    Jul. 8, 2004

(51) Int. Cl.
*G06F 13/00* (2006.01)
(52) U.S. Cl. .......... 710/300; 710/301; 710/302; 710/109; 710/104
(58) Field of Classification Search ........ 710/104, 710/302, 304, 109; 709/221; 711/202
See application file for complete search history.

(56) References Cited

U.S. PATENT DOCUMENTS

| | | | |
|---|---|---|---|
| 4,137,562 A | 1/1979 | Boeck et al. | |
| 4,304,001 A | 12/1981 | Cope | |
| 4,688,168 A | 8/1987 | Gudaitis et al. | |
| 4,773,005 A | 9/1988 | Sullivan et al. | |
| 4,942,571 A | 7/1990 | Möller et al. | |
| 4,969,147 A | 11/1990 | Markkula, Jr. et al. | |
| 4,996,684 A | 2/1991 | Morley et al. | |
| 5,138,709 A | 8/1992 | Jones et al. | |
| 5,223,806 A | 6/1993 | Curtis et al. | |

(Continued)

FOREIGN PATENT DOCUMENTS

EP    0 449 458 A1    10/1991

(Continued)

OTHER PUBLICATIONS

INFINEON: *C167CR 16-BIT Single-Chip Microcontroller*; Apr. 2000; 72 pages; XP-002201995; Published by Infineon Technologies AG.

(Continued)

*Primary Examiner*—Rehana Perveen
*Assistant Examiner*—Brian Misiura
(74) *Attorney, Agent, or Firm*—Alston & Bird LLP

(57) ABSTRACT

The present invention provides systems, methods, and bus controllers (12) for establishing communication with various network systems located on a network system (10). Importantly, the systems, methods, and bus controllers (12) of the present invention are capable recognizing that a new network device (16, 18, 20) has been added to an existing network and assigning it an address such that the added network device is identifiable on the network. Further, the systems, methods, and bus controllers (12) of the present invention may update the operating schedule that outlines communication in the network system between the bus controller (12) and the network devices (16, 18, 20) to include commands for communicating with the added network device. The systems, methods, and bus controllers (12) of the present invention may also detect when a network device (16, 18, 20) has been disconnected from a network system (10) and remove the commands associated with the networked device from the command schedule.

26 Claims, 6 Drawing Sheets

U.S. PATENT DOCUMENTS

| | | | |
|---|---|---|---|
| 5,251,208 A | 10/1993 | Canniff et al. | |
| 5,274,783 A | 12/1993 | House et al. | |
| 5,367,678 A | 11/1994 | Lee et al. | |
| 5,422,631 A * | 6/1995 | Gertz | 340/825.25 |
| 5,437,060 A | 7/1995 | Delamater et al. | |
| 5,445,128 A | 8/1995 | Letang et al. | |
| 5,615,404 A | 3/1997 | Knoll et al. | |
| 5,623,610 A | 4/1997 | Knoll et al. | |
| 5,694,555 A | 12/1997 | Morriss et al. | |
| 5,737,356 A | 4/1998 | Harrison et al. | |
| 5,742,847 A | 4/1998 | Knoll et al. | |
| 5,793,993 A * | 8/1998 | Broedner et al. | 710/106 |
| 5,801,602 A | 9/1998 | Fawal et al. | |
| 5,815,516 A | 9/1998 | Aaker et al. | |
| 5,909,430 A * | 6/1999 | Reaves | 370/254 |
| 5,909,556 A | 6/1999 | Morriss et al. | |
| 5,946,215 A | 8/1999 | Mito | |
| 5,974,475 A * | 10/1999 | Day et al. | 710/9 |
| 5,978,875 A | 11/1999 | Asano et al. | |
| 6,013,108 A | 1/2000 | Karolys et al. | |
| 6,115,713 A | 9/2000 | Pascucci et al. | |
| 6,163,823 A | 12/2000 | Henrikson et al. | |
| 6,195,724 B1 | 2/2001 | Stracovsky et al. | |
| 6,273,771 B1 | 8/2001 | Buckley et al. | |
| 6,452,938 B1 | 9/2002 | Fawal et al. | |
| 6,496,893 B1 * | 12/2002 | Arai | 710/302 |
| 6,600,972 B1 | 7/2003 | Morrison et al. | |
| 6,763,479 B1 * | 7/2004 | Hebert | 714/4 |
| 2003/0079000 A1 * | 4/2003 | Chamberlain | 709/220 |
| 2004/0131357 A1 * | 7/2004 | Farmer et al. | 398/67 |

FOREIGN PATENT DOCUMENTS

| | | |
|---|---|---|
| EP | 0 893 767 A | 1/1999 |
| WO | WO 99/08164 A | 2/1999 |
| WO | WO 99/63409 | 12/1999 |

OTHER PUBLICATIONS

Tobias Wenzel; INFINEON: *CAN Baudrate Detection with Infineon CAN Devices*; Jul. 1999, 11 pages; XP-002201996.

PCT Notification of Transmittal of the International Search Report, PCT International Search Report for PCT/US02/13190 (filed Apr. 26, 2002).

PCT Notification of Transmittal of the International Search Report, PCT International Search Report for PCT/US02/13246 (filed Apr. 26, 2002).

PCT Notification of Transmittal of the International Search Report, PCT International Search Report for PCT/US02/13303 (Field Apr. 26, 2002).

PCT Notification of Transmittal of the International Search Report; PCT International Search Report for PCT/US02/13366.

PCT Notification of Transmittal of the International Search Report, PCT International Search Report for PCT/US02/13367 (Filed Apr. 26, 2002).

PCT Communication Relating to the Results of the Partial International Search for PCT/US/01/47393.

European Search Report, Sep. 27, 2005.

* cited by examiner

SYSTEMS AND METHODS FOR ASSIGNING AN ADDRESS TO A NETWORK DEVICE ADDED TO AN EXISTING NETWORK

FIELD OF THE INVENTION

The present invention relates generally to establishing communication over a network bus and, more particularly, to systems and methods for assigning an address to a network device added to an existing network bus, where the address is used to identify the added network device.

BACKGROUND OF THE INVENTION

As systems, such as the multimedia entertainment, communications and diagnostic systems utilized by the automotive and aerospace industries, become more complex, a need arises for additional devices to communicate, either with each other or with a central controller or the like. Historically, these systems included dedicated wiring extending between the various devices in order to support communications therebetween. As systems have become more integrated and the communications requirements have been increased, the amount of dedicated wiring that would be required can quickly become excessively large, both in terms of the space required for the wiring and the cost of the wiring and the attendant installation.

As such, network systems have been developed to provide a common communications path between a plurality of network devices. In automotive and aerospace applications, for example, a network system can be utilized that includes a plurality of network devices located throughout the aircraft or vehicle to monitor various components and to collect diagnostic and status information. In this regard, diagnostic and status information relating to the strain, acceleration, pressure and/or temperature to which the various components of the automobile or aircraft are subjected may be collected and analyzed. By way of further example, a network bus architecture is currently being developed to support communications and the delivery of multimedia information to the occupants of a vehicle, such as an automobile, minivan, sports utility vehicle, aircraft, boat or the like. Advantageously, this network bus system would transport the audio signals, including streaming audio signals, produced by one or more network devices, such as a radio, a cassette tape player, a compact disc player or the like to selected speakers or headphone jacks throughout the vehicle. Similarly, the network bus may support voice and data communications with a cellular telephone carried by an occupant of the vehicle, as well as communications with a laptop computer, a handheld computing device or the like. In addition, the network bus may transmit video signals, including streaming video signals, from a television receiver, a videocassette recorder or other video source to one or more video monitors. Further, the network bus system may transport information related to diagnostic performance of the vehicle. Further, the network bus system may transmit sensor and actuator signals to and from devices such as drivetrain devices, passive restraint devices, crash avoidance devices, drive-by-wire devices, or the like.

In addition to the variety of network devices that are connected to a network bus, one or more controllers are also generally connected to the network bus for receiving data from the various devices and for sending commands to the devices. Among other things, these commands specify the manner in which the various devices are to function including the manner in which the various devices are to transmit information over the network bus. Additionally, the controller(s) can receive input from an operator, such as an occupant of the vehicle. This input can include, for example, an indication of the source(s) of the signals to be transmitted over the network bus as well as the destination of the signals.

An important aspect of network systems is the ability of the controller(s) to individually address either one or a subset of the network devices on the network system for either receiving information from or transmitting data to the network devices. For example, as described above, a typical network system may include several different types of network devices commonly connected to the same network bus. These devices may include multimedia devices, sensors, actuators, etc. all employed to provide certain functions within the system. In these network systems, the bus controller(s) must be able to address the network devices such that they perform their intended functions in the network system. In this regard, most network systems include an addressing scheme in which each of the network devices has an associated unique address. This unique address is used with the network system to identify and communicate with the network devices.

An important goal of many existing network systems and network systems currently in development is the ability to provide a flexible open framework system. Specifically, it is advantageous to provide a network system that allows for easy application of additional network devices to the current system or to remove network devices from the system. For example, in cases where network systems are used for diagnostic monitoring, it may be advantageous to allow for expansion of the network system by addition of new network devices, such as for example additional sensors or actuators. It may also be advantageous to allow for addition of portable or temporary network devices to the network system, such as diagnostic equipment, lap tops, etc., to perform diagnostics or other functions in the network. Similarly, in instances in which the network system includes a multimedia and/or communication component, it may be advantageous to allow systems such as cell phones, lap tops, game devices, etc. to be quickly and easily added or disconnected from the network system in a plug-n-play manner. An example would be the network system described above for use with vehicles, where the user may wish to connect their cell phone, laptop, multimedia player, etc. into the existing network system of the vehicle.

Although providing an open framework to allow expandability of the network system and/or plug-n-play capabilities is advantageous, there may be some difficulties implementing these features in current network systems. Specifically, as discussed above, many conventional network systems communicate with the various network devices using a unique address associated with the network device. These unique addresses are typically assigned during initial configuration of the network, at which time all network devices on the network bus receive their unique address. Further, during operation, the bus controller(s) typically uses a schedule, sometimes referred to as an operation or command schedule, to control the operation of the network system. The schedule contains a list of commands with predictable responses scheduled to communicate with the various network devices on the network using the addresses assigned to the network devices. As the addresses are typically assigned before communication in accordance with the schedule is began and the schedule typically only includes commands for the network devices currently connected to the network bus, subsequent network devices added to the network bus may not have an assigned address or be included in the schedule for communication on the network bus.

One solution to this problem is to preconfigure the added network device to have an assigned address. In this instance, the command schedule could also include commands that determine whether the network device is currently connected to the network bus and if so, perform desired communication with the added network device. However, this solution would require that addresses be set aside for a broad range of devices that could possibly be connected to the network bus and that the schedule include code for many network devices that may never be connected to the network bus. This may increase memory size and delay in the system. As such, a system is needed that allows for additional network devices to be added to the bus network in a plug-n-play fashion, while at the same time minimizing complexity and delay time.

SUMMARY OF THE INVENTION

As set forth below, the present invention provides systems, methods, and bus controllers for establishing communication on a network bus. Importantly, the systems, methods, and bus controllers of the present invention are capable of providing a unique address for additional network devices added to the network bus after an initial set of network devices have been assigned addresses and communication has commenced with the initial set of network devices. Further, the systems, methods, and bus controllers of the present invention may also configure the command schedule used to communicate with the network devices to include commands for communicating with the newly added network device. As such, the systems, methods, and bus controllers of the present invention allow for the addition of new network devices in a plug-n-play fashion without having to prestore an address for the newly added network device or include commands in the initial schedule used by the bus controller in anticipation that the additional network device will be added to the network system.

For example, in one embodiment, the present invention provides a system for communicating over a network bus. The system includes an initial set of network devices connected to a network bus that each has an assigned logical address for identifying the individual network devices. Additionally, the system includes a bus controller in electrical communication with the network bus for establishing communication with network devices connected to the network bus using the logical address assigned to each network device. In the system of the present invention, if an additional network device is electrically connected to the network bus after the bus controller has established communication with the initial set of network devices, the bus controller will assign a logical address to the additional network device. This, in turn, makes the additional network device identifiable on the network bus.

In some embodiments of the present invention, the bus controller not only assigns a logical address to the newly added network device, but also initially assigns logical addresses for each of the network devices of the initial set of network devices. Specifically, in one embodiment, the logical address for each network device is assigned based on a unique aspect of the network device. In this embodiment, the bus controller initially assigns a unique logical address to each network device of the set of initial network devices based on a unique aspect of each of the network devices. Further, after the bus controller has established communication with the set of initial network devices, if an additional network device is added, the bus controller assigns a logical address to the additional network based on a unique aspect of the additional network device.

As mentioned, the bus controller may assign the logical addresses to the network devices based on a unique aspect of each network device. In one embodiment, each network device includes an associated manufacturing identifier that is based partially on the geographic location where the network device was manufactured. In this embodiment of the present invention, the bus controller of the present invention assigns logical addresses to the network devices of the initial set of network devices and additional network devices based on the manufacturing identifier associated with each network device.

In addition to having a unique manufacturing identifier, in some embodiments, the network devices may also include a function type identifier indicating characteristics concerning the network device. For example, the function type identifier may indicate whether the network device is a sensor, actuator, multimedia device, computer, cell phone, etc. In this embodiment, the bus controller may assign logical addresses based on both the manufacture identifier and the function type identifier associated with the network device. For example, the bus controller of the present invention may segment the possible logical addresses to be assigned to the network devices into separate ranges based on the type of network devices. Network devices such as a sensor may have a logical address assigned from a first range of logical addresses, an actuator may have a logical address assigned from a second range of logical addresses, a multimedia device may have a logical address assigned from a third range of logical addresses, and so on. In this embodiment of the present invention, the bus controller initially determines the manufacture identity associated with a network device and then the function type identity. Based on the two identities, the bus controller of the present invention assigns the network device a logical address from the range of logical addresses associated with the function type identity of the network device.

As discussed above, during an initial set up period, the bus controller of the present invention may assign logical addresses to the individual network devices of the set of initial network devices and then commence communication with the network devices. To determine whether additional network devices have been added, the bus controller of the present invention may periodically issue a query on the network bus requesting that additional network devices connected to the network bus not having an assigned logical address respond to the bus controller. If new network devices have been added to the network bus, they will provide an indication to the bus controller via the network bus. The bus controller of the present invention will then assign each of the added network devices a logical address, thereby making the added network devices available for communication on the network bus.

In an additional embodiment, each of the additional network devices has an associated common null address prior to connection to the network bus. The common null address is an address shared by all additional network devices that could be added to the network. In this embodiment, after the bus controller has established communication with the network devices of the initial set of network devices, the bus controller transmits a query on the network bus requesting that additional network devices connected to the network bus having an associated common null address respond to the bus controller. Thereafter, the bus controller replaces the common null address associated with each of the additional network devices with a logical address.

As discussed in the above embodiment, all additional network devices of this embodiment have an associated common null address prior to connection to the network bus, and are provided with an assigned logical address when connected to the network bus. In embodiments in which the additional network device is subsequently removed from the network bus, the network device replaces the assigned logical address with the common null address to thereby revert back to the common null address. The bus controller can monitor network devices that are currently placed into the operational schedule constantly to verify that they have not been removed from the network. Further, the bus controller can monitor all additional devices currently not in the operational schedule by periodically sending a query to these devices. Devices removed from the network are removed from the network controller's logical address assignment.

As mentioned, after the bus controller has assigned logical addresses to each of the network devices, it then establishes communication with the network devices. In some embodiments of the present invention, the bus controller may use an command schedule that outlines timing and communication schedules for communicating with each of the network devices. In this embodiment, if an additional network device is added to the network bus, the bus controller may handle assignment of a logical address to the additional network device in two ways. Specifically, the bus controller may either continue communication with the initial network devices in accordance with the command schedule and assign a logical address to the additional network device during predefined pauses in the command schedule, or the bus controller may postpone communication with the other network devices to assign the logical address.

In addition to assigning a logical address to the additional network device connected to the network bus to make it identifiable, in some embodiments, the bus controller of the present invention may also be adaptable to add the additional network device to the command schedule. For example, in one embodiment, the additional network device may include an associated function type identifier indicating the function of the additional network device. Using this function type identifier and/or additional information associated with the network device, the bus controller of the present invention may update the command schedule to include the additional network device, thereby allowing the bus controller to communicate with the additional network device.

DETAILED DESCRIPTION OF THE INVENTION

Figure 1:
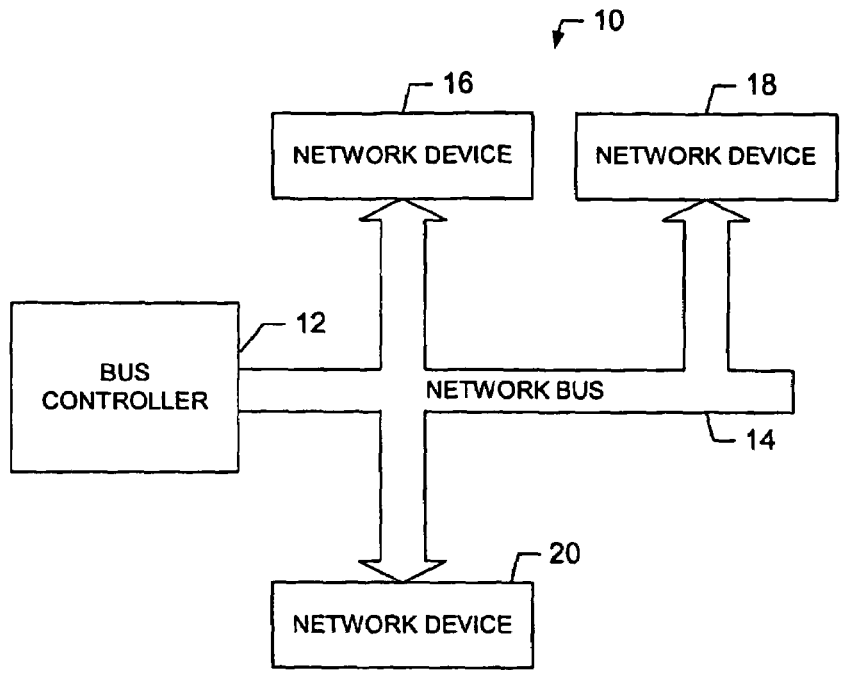
FIG. 1 is a block diagram of a general network system in which the systems, methods, and bus controllers of the present invention may be implemented.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As mentioned above and described in greater detail below, the present invention provides systems, methods, and bus controllers for establishing communication over a network bus with network devices connected thereto. Importantly, the systems, methods, and bus controllers of the present invention allow additional network devices to be connected to an existing network system during operation of the network system. The systems, methods, and bus controllers of the present invention assign a logical address to the newly added network device so that the added network device is made identifiable on the network bus. Further, in some embodiments, the systems, methods, and bus controllers of the present invention update the command schedule used by the bus controller to communicate with the network devices to include the added network device, such that the bus controller can communicate with the newly added network device. Additionally, the systems, methods, and bus controllers of the present invention may detect when a network device has been disconnected from the network system. As such, the present invention allows additional network devices to be added to or disconnected from an existing network system in a plug-n-play manner.

At the outset, it is important to note that the systems, methods, and bus controllers of the present invention may be implemented in any type of network system. The network system may be resident in an aircraft, spacecraft, vehicle, building, or any other packages or structure. As examples, the systems, methods, and bus controllers of the present invention may be implemented in a network system resident on an aircraft, in which the network includes a plurality of sensors, actuators, etc. all connected to a common network bus for communication with a bus controller to determine performance, status, etc. concerning the various components of the aircraft.

The systems, methods, and bus controllers of the present invention may also be implemented in a network system in a vehicle such as an automobile in which the network system includes sensors and actuators connected to different components of the vehicle. The network system may also include multimedia devices such as radios, cassette tape players, compact disc players or the like, and associated speakers or headphone jacks throughout the vehicle. Similarly, the network bus may support voice and data communications with a cellular telephone carried by an occupant of the vehicle, as well as communications with a laptop computer, a handheld computing device or the like. In addition, the network bus may transmit video signals, including streaming video signals, from a television receiver, a videocassette recorder or other video source to one or more video monitors. Regardless of the network system in which the present invention is implemented, the systems, methods, and bus controllers of the present invention allow for additional network devices to be added to or disconnected from an existing network system in a plug-n-play manner.

With reference to FIG. 1, a generalized network system in which the present invention may be implemented is illustrated. Specifically, FIG. 1 illustrates a common master/slave network system 10 having a host computer or bus controller 12, a network bus 14, and a number of network devices 16–20. In this configuration, the bus controller typically provides configuration and control of the network 10. Further, the individual network devices include assigned identifiers or addresses that uniquely define the network devices on the bus. In operation, the bus controller typically sends commands via the network bus to the network devices, along with the address of the network device or network devices that are supposed to follow the command. The network device or devices designated by the address sent with the command, perform the actions associated with the command and may respond by placing data on the network bus to be sent to either the bus controller or another network device.

The bus controller typically uses an command schedule, sometimes referred to as an operation schedule, that outlines the communications between the bus controller and the network devices. The command schedule takes into account the sampling rates and other requirements of the devices and lists the commands and timing for commands to the various network devices to perform the desired operations of the network.

An important aspect of the above described network system is the need for unique address assignments for each of the network devices so that each network device can be identified on the network for transmission of commands and data. Further, it is important that each of the network devices is included in the command schedule used by the bus controller for communicating with the network devices. In light of this, an important procedure for adding additional network devices to an existing network system is the assignment of an address for the added network device and the inclusion of the network device in the command schedule. Many conventional network systems solve this problem by preassigning addresses to possible network devices and including commands directed to the possible network devices in the command schedule. This conventional solution may be disadvantageous as it adds complexity to the network system. As such, the present invention provides systems, methods, and bus controllers that address problems associated with adding additional network devices to an existing network.

As indicated, the systems, methods, and bus controllers of the present invention may be implemented in any network system. To provide a more complete disclosure, however, discussed below is a specific example of the use of the present invention in a particular network system. U.S. patent application Ser. No. 09/735,146, entitled: Network Device Interface for Digitally Interfacing Data Channels to a Controller via a Network filed on Dec. 12, 2000 and U.S. patent application Ser. No. 09/736,878, entitled: Network Controller for Digitally Controlling Remote Devices via a Common Bus filed on Dec. 14, 2000 and incorporated herein by reference describe a network system that uses a bus controller to control a variety of network devices using a low-level instruction protocol. These applications also describe unique NDI devices that may be associated with each network device in the network for handling communication between the network devices and the bus controller. The network system provided in these applications is contemplated for a broad range of uses, some of which involve the connection and disconnection of network devices in a plug-n-play manner. Below is provided an illustration of the systems, methods, and bus controllers of the present invention used in conjunction with this network system. In the below description, the network system of U.S. patent application Ser. Nos. 09/735,146 and 09/736,878 is referred to as the example network system.

It must be understood that this is only one example of the present invention implemented in a particular network system. The present invention should not be limited to the implementation discussed below. For example, the network system described below uses the manufacture identity for assigning logical addresses. It must be understood, however, that any unique aspect of the network devices may be used for logical address assignment. Also, the network system described below may use the function type identity of the device to assign logical addresses by category. However, any criteria may be used to categorize the logical addresses. Further, the network system described below assigns logical addresses to the network devices. However, it should be understood that the network system can additionally or alternatively assign group addresses to the network devices. In this regard, for information on group addresses associated with the network devices, see the U.S. patent application Ser. No. 09/736,878.

As described in U.S. patent application Ser. Nos. 09/735, 146 and 09/736,878, the example network system uses a manufacture identity to create logical addresses for each of the network devices connected to the system. The manufacture identity is a unique aspect of each device. This manufacture identity is typically referred to as the Universal Unique Identifier (UUID) code. The UUID code is an 80-bit code stored in each of the network devices that is unique to each network device and is based at least partially on the location and date the network device was manufactured. Given the large size of the UUID code, the example network system typically does not use the UUID code itself for identification of the network devices, instead the bus controller, based on the UUID code, creates a shorter, more manageable logical address for each network device.

Figure 2A:
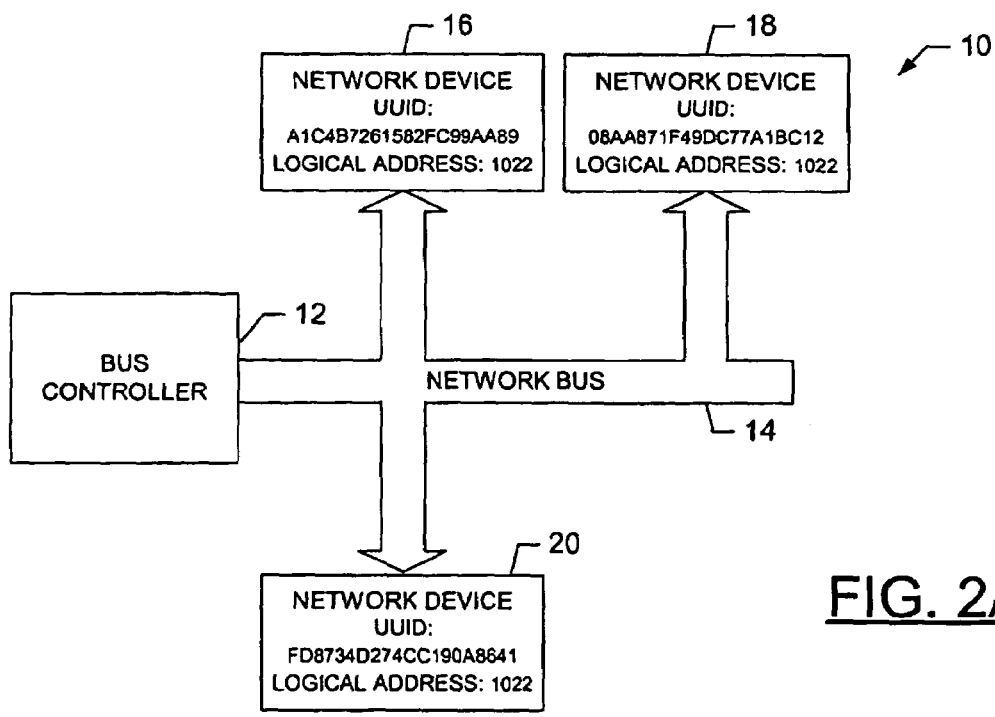
FIGS. 2A and 2B are block diagrams illustrating initialization and assignment of logical addresses to an initial set of network devices of a network system based on manufacture identity according to one embodiment of the present invention.
Figure 2B:
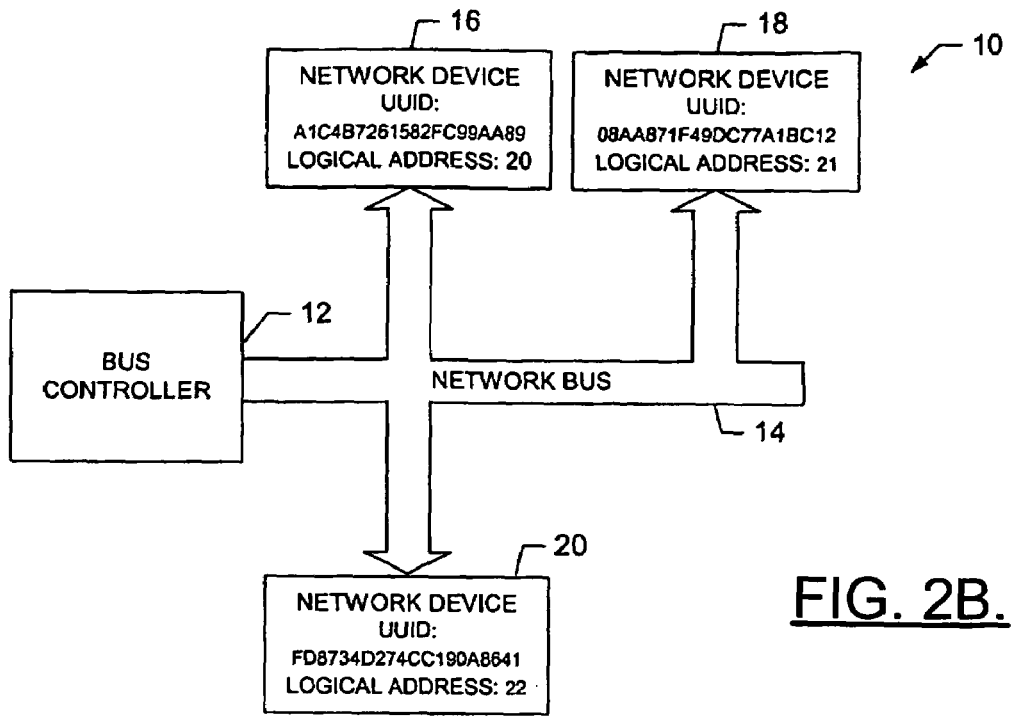
Figure 3:
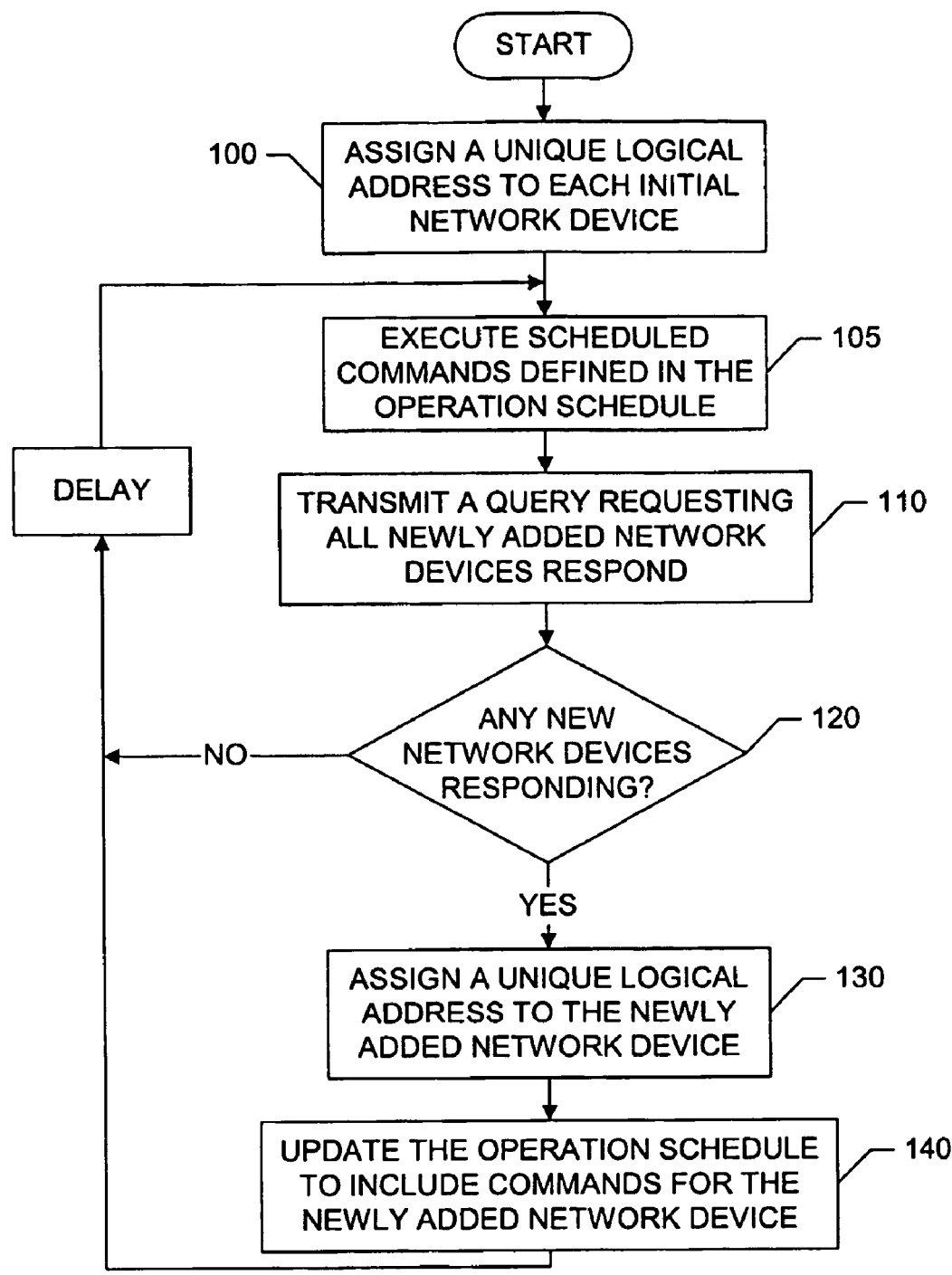
FIG. 3 is an operational block diagram illustrating assignment of logical addresses to both an initial set of network devices and subsequently added network devices, as well as the removal of a network device for a network system according to one embodiment of the present invention.

Specifically, FIG. 2A illustrates the network system 10 of FIG. 1 prior to initialization of the network. In this instance, the network system 10 includes three initial network devices each having a unique manufacture identity or UUID code. At the outset, each of the network devices shares a common null address, (shown here as 1022). The common logical address could be any chosen value. With reference to FIG. 3, during initialization, the bus controller of the present invention initially assigns a unique logical address to each of the initial network devices replacing the common null address. (See step 100). This assignment process is essentially a competition based on the bits of the UUID code associated with each network device, so that the bus controller through process of elimination can uniquely identify each network device and assign it a logical address. The bus controller of the present invention sends out a device inventory command along with either a global address (0) or the common null address to place all of the initial network devices in an inventory mode. Through a series of commands that allow the bus controller to evaluate the UUID code for each network device, a logical address is assigned to each of the initial set of network devices on at a time. FIG. 2B illustrates the network system of FIG. 2A after the initial set of network devices have been assigned unique logical addresses based on their associated UUID code. The assignment of logical addresses based un UUID code is explained more fully in U.S. patent application Ser. No. 09/735,146, which has been incorporated by reference in its entirety.

Figure 2C:
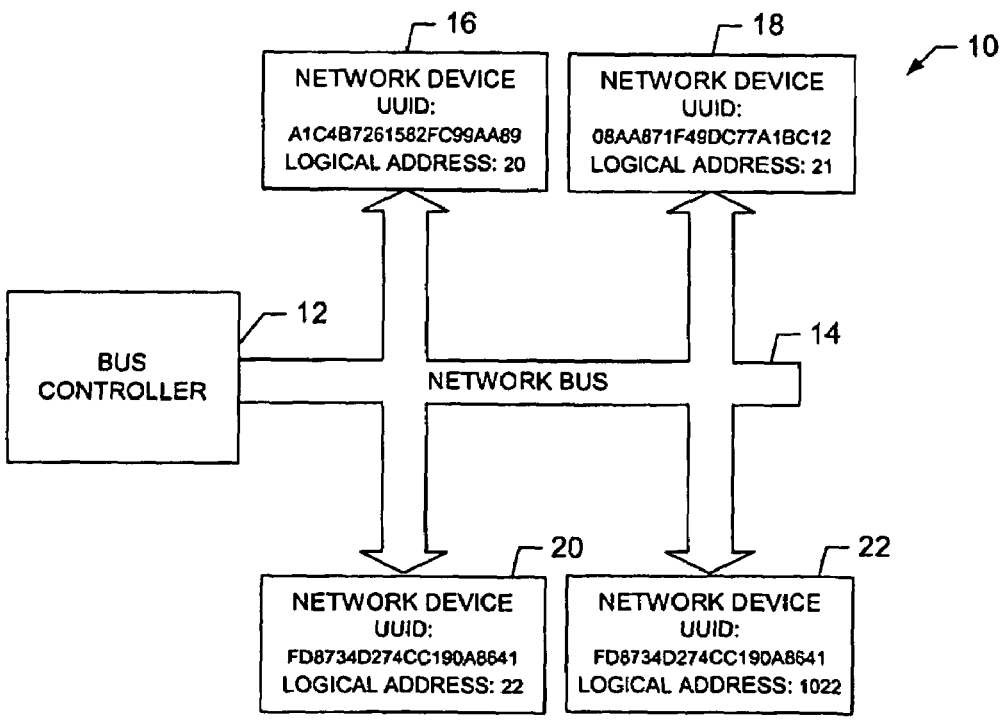
FIGS. 2C and 2D are block diagrams illustrating assignment of a logical address based on manufacture identity to a new network device added during operation of a network system according to one embodiment of the present invention.

As shown in FIG. 2C, during operation of the network system 10, in which the bus controller is communicating with the initial set of network devices 16–20 using an command schedule (FIG. 3 step 105), an additional network device 22 or several additional network devices may be added to the network system 10. As the added network device does not have an assigned unique address and is not included in the command schedule, the newly added network device is not yet available for communication on the network system.

With reference to FIG. 3, to remedy this problem, the bus controller of the present invention detects that an additional network device has been added and assigns it an address. It may also add the network device to the command schedule. Specifically, to detect whether additional network devices have been added to the network, the bus controller of the present invention may periodically, in addition to performing the commands in the command schedule, transmit a query on the network bus requesting that all network devices not having an assigned logical address respond. (See step 110). This query may be in the form of a status command as discussed in U.S. patent application Ser. No. 09/735,146 or similar type command. With respect to the query, in one advantageous embodiment, each network device, prior to assignment of a unique logical address, has the same common null address. In this embodiment, to determine if additional network devices have been added to the network system, after those already on the network have been assigned unique logical addresses, the bus controller of the present invention transmits a query commanding network devices having a common null address to respond. For example, as shown in FIG. 2C, the newly added network device 22 has an associated UUID code and a common null address, (1022). In this instance, the bus controller will send a command requesting that all network devices having a logical address of 1022 respond. (See step 110).

Figure 2D:
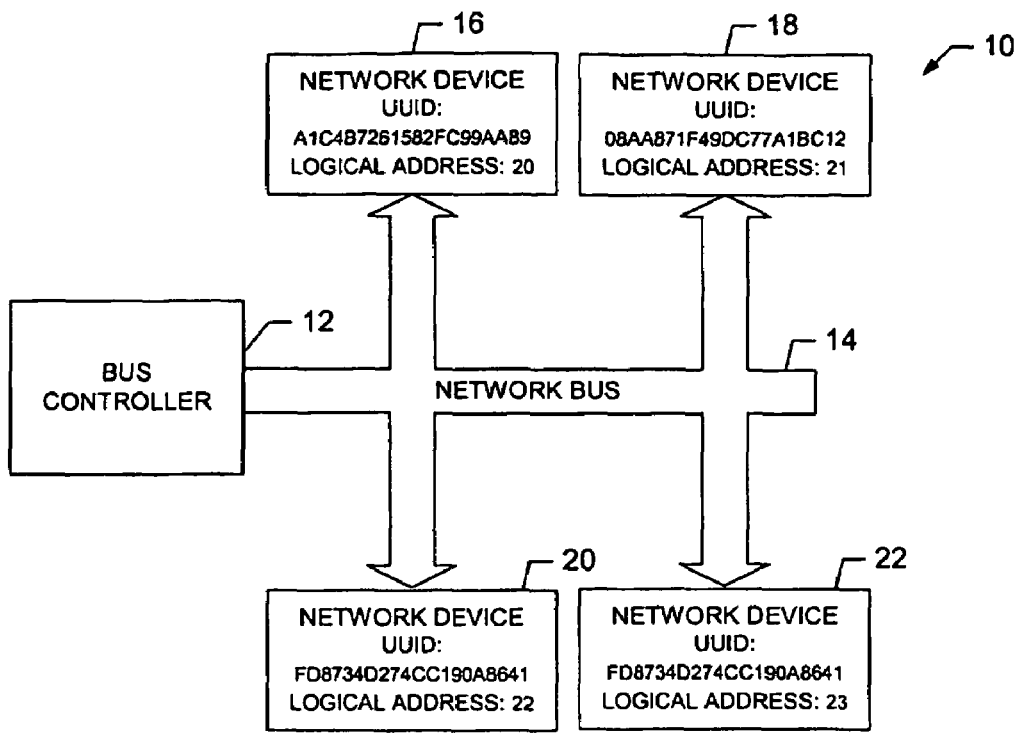

In response to the command from the bus controller, any additional network devices that have been added since the last assignment of logical addresses will respond to the bus controller across the network bus using a pulse, message or other similar signal. If the bus controller receives a signal that new network devices have been added, (see step 120), the bus controller of the present invention can then assign a unique logical address to each of the new network devices replacing the common null address. (See step 130). The logical address is assigned by performing a device inventory on only the newly added network devices. In other words, the bus controller of the present invention evaluates the UUID code associated with each new network device. As each newly added network device is identified by the bus controller in the UUID competition through process of elimination, the bus controller assigns a unique logical address to the network device. The logical address replaces the common null address that was previously associated with the network device. As such, the bus controller of the present invention provides a unique identity to the added network devices, such that the network devices are identifiable on the network bus. With reference to FIG. 2D, the newly added network device 22 has been assigned a unique logical address of 23 that identifies it on the network.

In cases where only one new network device has been added, the bus controller may assign the next logical address to the new network device without performing the UUID competition. If more than one new network device has been added since the last assignment of logical addresses, then all of the newly added network devices will respond by sending a pulse or signal to the bus controller in response to the request from the bus controller. Because all of the newly added devices will respond at essentially the same time, the signals sent to the bus controller will be affected by the signals transmitted by the other newly added remote devices, indicating to the bus controller that more than one network device has been added. In which case, the bus controller will perform the UUID competition. However, if only one new network device has been added, its signal will not be distorted, and the bus controller of the present invention will know that only one new network device has been added. In this instance, the bus controller may just assign the next available logical address to the new network device.

Importantly, as illustrated, the systems, methods, and bus controllers of the present invention allow additional network devices to be added to an existing network system and be made identifiable on the network system. As such, portable systems such as cell phones, laptops, or additional permanent network devices can be easily added to an existing network.

As mentioned, the bus controller, during execution of the command schedule, periodically transmits a query on the network bus to determine if new network devices have been added to the network system. In one embodiment of the present invention, if a new network device has been detected, the bus controller of the present invention will postpone operation of the schedule and will assign a logical address to the new network device. In some embodiments, however, where it is critical for the bus controller to continuously operate in accordance with the command schedule, the bus controller may continue to perform the steps outlined in the schedule and assign an address to the added network device during pauses in the command schedule.

With regard to the assignment of logical addresses, the logical address may be assigned to the initial and newly added network devices in any manner, be it in a sequential order as each network device is detected or based on a unique aspect of the network device. In the above embodiment, the logical addresses are assigned based on a manufacture identity of the network device. Given that there may be a large number of network devices in some network systems, in some embodiments, the bus controller of the present invention may further assign logical addresses based on the type of network device.

Specifically, as discussed above, some network systems, such as those installed in automobiles, may have a wide variety of different types of network devices connected to the network bus. For example, the network system may include sensors, actuators, multi-media systems, cell phones, laptops etc. In these instances, it may be advantageous to provide logical addresses to the network devices based on a function type identity. As such, in one embodiment of the present invention, in addition to including a stored manufacture identity, the network devices also include a stored function type identity. This function type identity may simply indicate the type of network device or may include more detailed information concerning the operation of the network device.

Figure 4A:
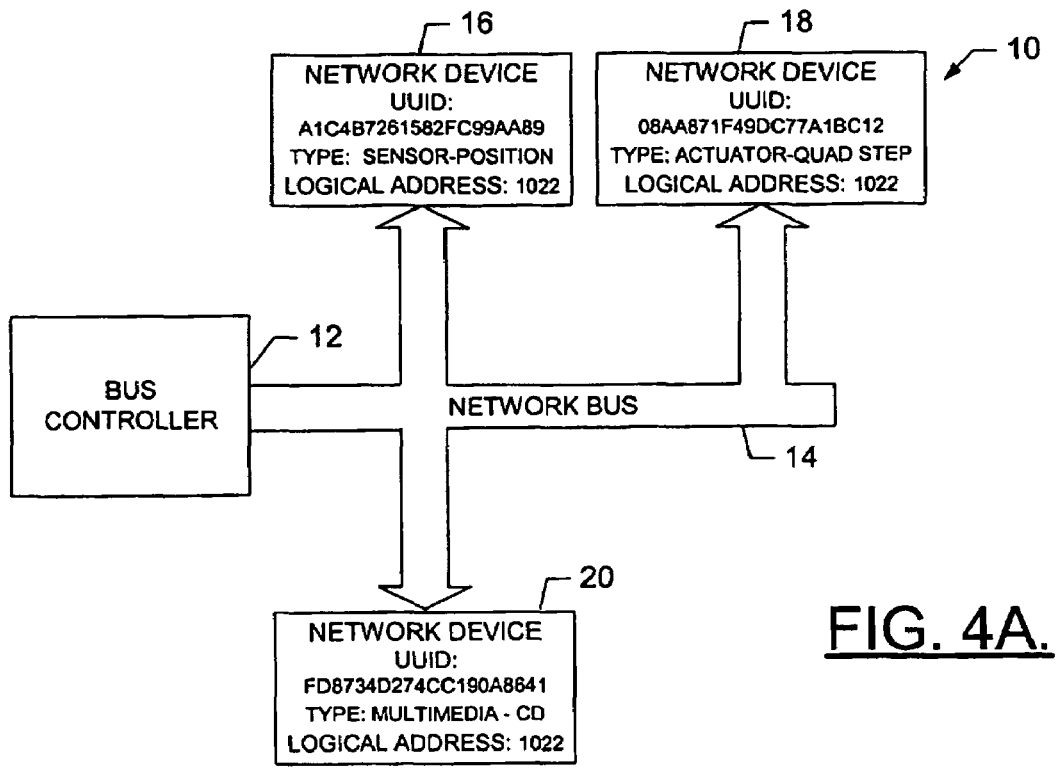
FIGS. 4A and 4B are block diagrams illustrating initialization and assignment of logical addresses to an initial set of network devices of a network system based on manufacture identity and function type identity according to one embodiment of the present invention.

As an example, FIG. 4A is an illustration of the network system 10 of FIG. 2A where each of the network devices also includes an associated function type identity. In this embodiment, the network device labeled 16 is a sensor having an associated function type identity, typically in bit format, indicating that it is a position sensor. Further, the network device labeled 18 is an actuator, and the network device labeled 20 is a multimedia device.

In this embodiment, to assign logical addresses by manufacture code and function type identity, the bus controller of the present invention creates logical address ranges for each type of network device that can be connected to the network system. In other words, the bus controller creates a first range of logical addresses for sensors, a second for actuators, a third for multimedia devices, and so on. In the embodiment shown in FIG. 4A, the bus controller uses logical values in the range of 20–29 for sensors, 30–39 for actuators, and 40–49 for multimedia devices.

Figure 4B:
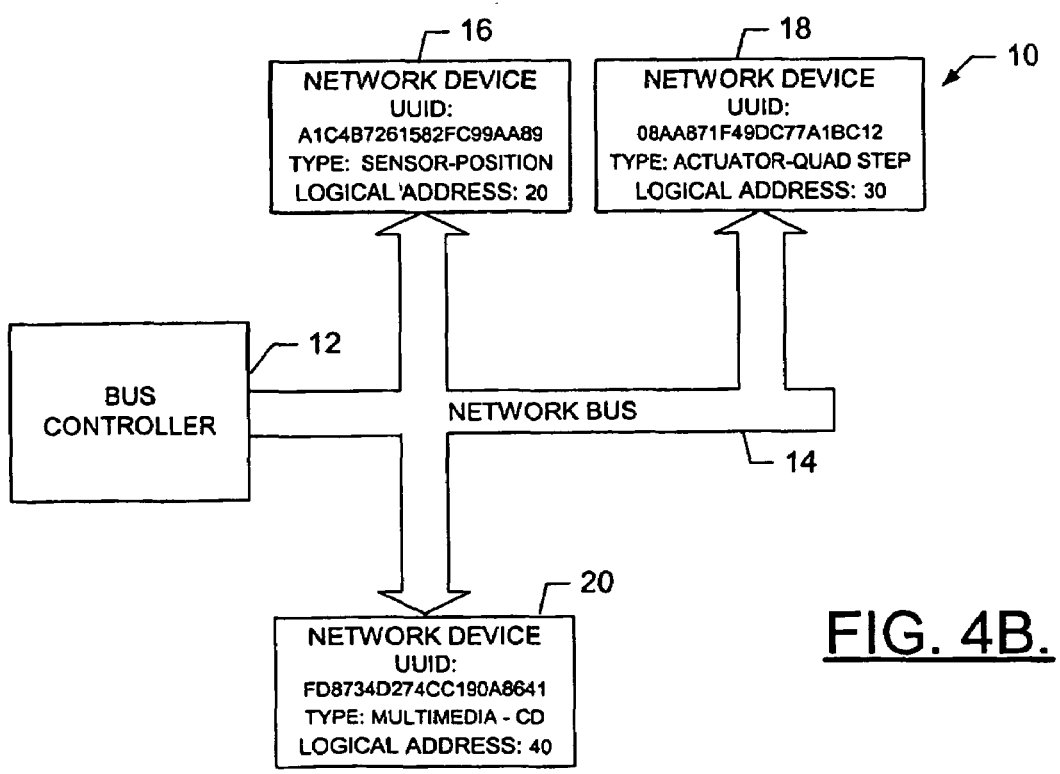

With regard to FIG. 3, in operation, when assigning logical addresses, the bus controller of the present invention initially performs an assignment competition between all of the network devices based on the manufacture identity associated with each network device. As each network device wins the competition, the bus controller evaluates the function type identity associated with the network device. Based on the function type identity, the bus controller of the present invention assigns the next available logical address from the range of logical addresses associated with the function type of device. (See step 100). As shown in FIG. 4B, in this particular embodiment, the initial set of network devices would be given the following logical addresses: sensor network device 16 has a logical address 20, actuator network device 18 has a logical address 30, and multimedia device 20 has a logical address 40.

Figure 4C:
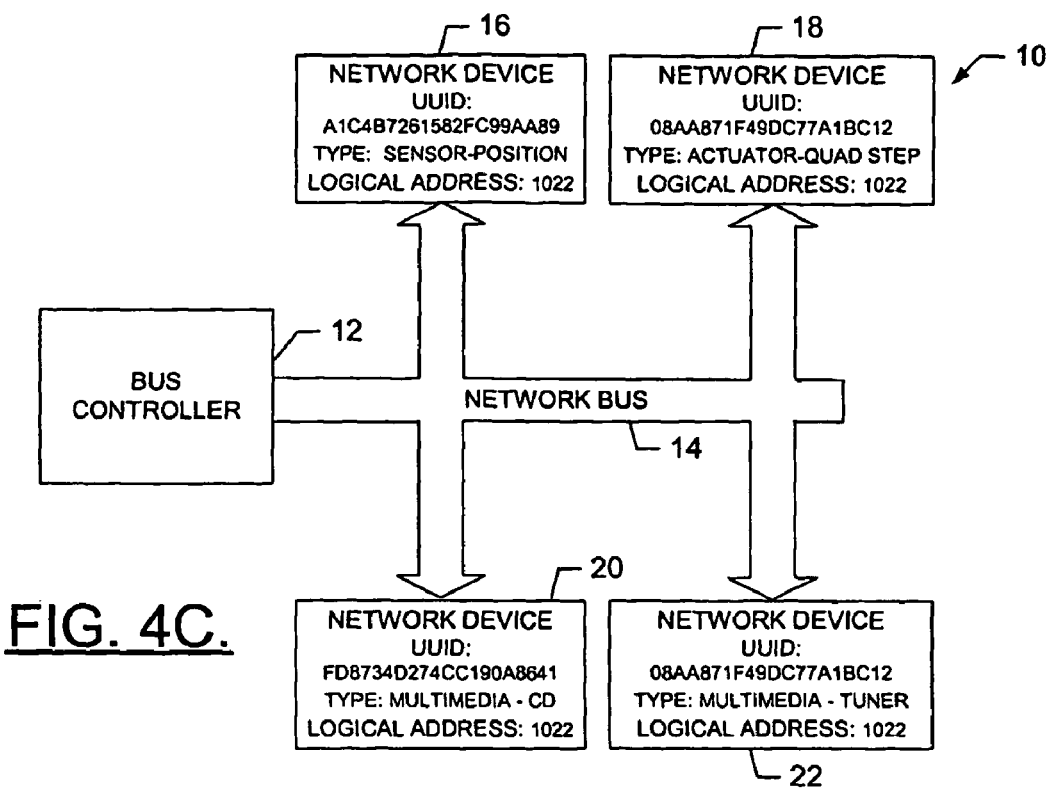
FIGS. 4C and 4D illustrate assignment of a logical address based on manufacture identity and function type identity to a new network device added during operation of a network system according to one embodiment of the present invention.
Figure 4D:
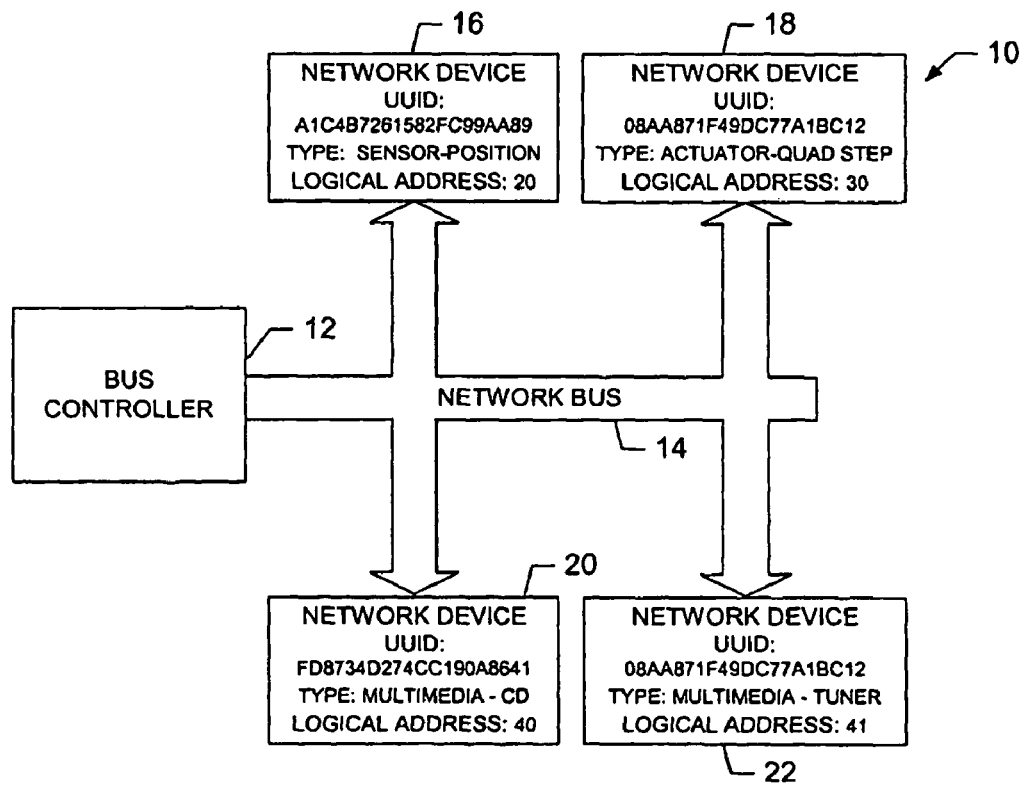

As shown in FIG. 4C, during operation of the network system 10 of this embodiment, an additional network device 22 having a function type identity of a multimedia device and a common null logical address is added to the network. Following the addition of the network device, in accordance with the command schedule, the bus controller of the present invention transmits a query requesting that all network devices having a common null address respond. (See step 110). In response to the command from the bus controller, the additional network device 22 responds to the bus controller across the network bus using a pulse or other similar signal. (See step 120). The bus controller performs a device inventory on the newly added network device. After evaluating the UUID code to identify the network device, the bus controller next loads and evaluates the function type identity of the device. As shown in FIG. 4D, based on the function type identity of the device, bus controller of the present invention assigns the newly added network device a logical address of 41 as it is the next available logical address from the range of logical addresses set aside by the bus controller. (See step 130). As such, additional network devices may be added during the operation of the network system and assigned logical addresses from the range of logical addresses corresponding to the network device's function type identity.

In the above description, the bus controller of the present invention initially performs a UUID competition on all network devices and, as each device wins, the bus controller then looks at the function type to determine which range of codes to use in assigning the unique logical address. In some embodiments, however, the bus controller of the present invention may first look at the function type for each device and then the UUID code for logical address assignment.

As described above, the bus controller of the present invention is capable of assigning a unique address to a newly added network device, so that it is identifiable on the network system. In addition, in some embodiments, the bus controller is also capable of updating the command schedule to include commands for the newly added network device. Specifically, the command schedule typically includes a series of commands directed to either one or a group of network devices that are to be communicated with or polled by the bus controller at scheduled time intervals. By knowing the function type identity of the network device, the bus controller, in some embodiments, may update the command schedule to include the additional network device.

For example, in one embodiment, the function type identity may include several pieces of information concerning the network device, such as the type of device, the time interval between communications, details regarding input and output ports of the network device, and the set of commands that should be used to communicate with the network device. In this embodiment, after the bus controller has assigned a logical address to the network device, the bus controller of the present invention, using the function type identity information, will update the command schedule to include directions for communicating with the newly added network device. (See step 140).

As an alternative, the bus controller may include a memory device having prestored scheduling information tailored for different types of network devices. In this instance, the bus controller evaluates the type of network device based on the associated function type identity and retrieves the prestored schedule information relating to the function type identity and updates the command schedule with this information. For example, the bus controller may include prestored schedule information for multimedia devices that describes the timing and control information needed to communicate with the network device. In this instance, if the newly added network device is a multimedia device, the bus controller will first assign it a logical address based on its manufacture identity or maybe both its manufacture identity and function type identity. The bus controller will then use the function type identity to retrieve the prestored schedule information for multimedia devices and update the command schedule to include this information for communication with the newly added network device. (See step 140).

In still a further embodiment, the network system may already include network devices of the same type as the newly added network device, such as in the case of an added sensor or actuator added to a bank of existing sensors or actuators. In this instance, because the newly added sensor will have the same scheduling information as the existing network devices of the same type, the bus controller of the present invention merely updates the information already stored for the existing network devices in the command schedule to include the logical address of the added network device.

In addition to allowing for the addition of new network devices, the present invention may also allow for network devices on the network system to be removed during operation. As stated previously, some of the network devices contemplated for connection to the network system may be portable devices, such as personal multimedia equipment, cell phones, laptops, etc. that are meant to be added and removed from the network system in a plug-n-play manner. When a network device is removed from the network system, the unique logical address assigned and stored in the network device should be reset to the common null address. Further, the information relating to the network device should be removed from the command schedule, so that bus controller does not continue to perform commands for a network device that is no longer connected to the network.

In this regard, as the bus controller performs communication with the network devices in accordance with the command schedule and/or a periodic query of currently unscheduled devices, if a network device is removed from the network, it will cease communicating with the bus controller. If the network device does not respond to the bus controller within a selected time period, the bus controller will assume that the network device has been removed from the network. In this instance, the bus controller will update the command schedule by removing the commands associated with the network device from the schedule.

Figure 2E:
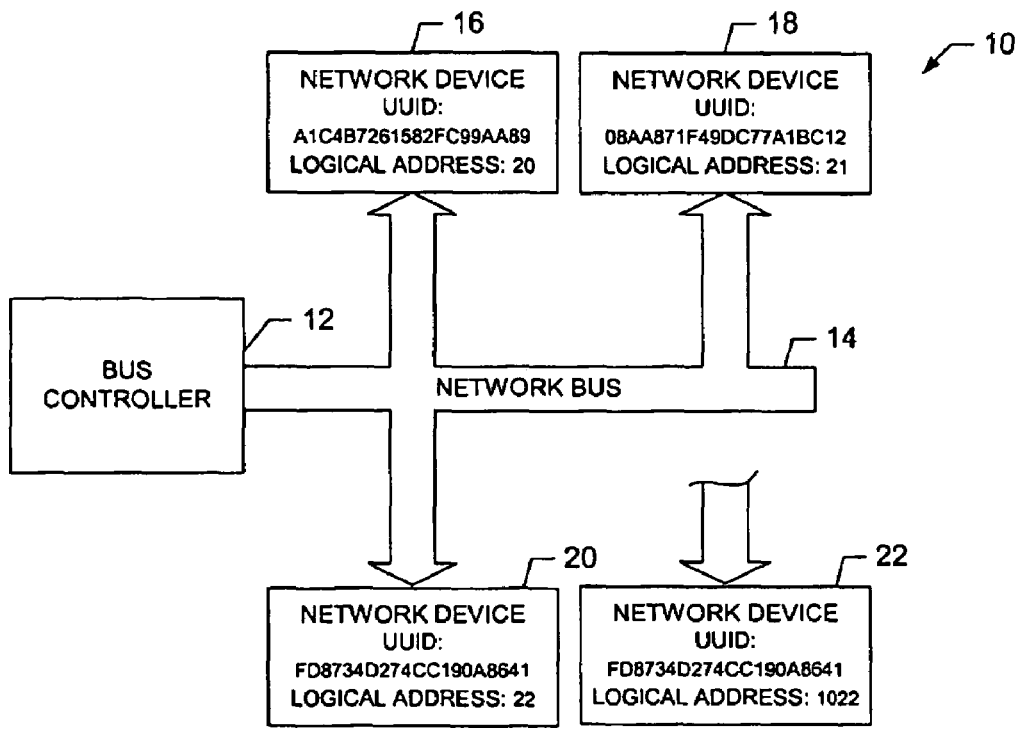
FIG. 2E is a block diagram illustrating the removal of a device from the network and the reversion of the logical address back to the null address according to one embodiment of the present invention.

Further, the remote device may be configured to reset the stored logical address to the common null address when it is removed from the network system. As such, when or if the network device is reconnected to the network, it will properly respond to the controller's request that all network devices having null address respond so that the bus controller can again assign the network device a unique logical address. As an example, FIG. 2E illustrates removal of the network device labeled 22 from the network system 10. As can be seen, the logical address 23 earlier assigned by the bus controller has been replaced by the common null address of 1022.

The above embodiments of the present invention are described in conjunction with the example network system of U.S. patent application Ser. Nos. 09/735,146 and 09/736,878. The example network system typically include a network device interface (NDI) connected between the network bus and the network devices and translates commands from the bus controller to the remote device. In some embodiments, the manufacture identity and function type identity are stored in the NDI. In this instance, when a network device is added to the network bus, the NDI associated with the network device will contain the manufacture and function type identities associated with the newly added network device and will communicate with the bus controller.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system for establishing communication over a network bus comprising:
   an initial set of network devices in electrical communication with the network bus, wherein each of the network devices of said initial set of network devices has an assigned logical address identifying the network devices on the network bus;
   a bus controller in electrical communication with the network bus for establishing communication with network devices connected to the network bus using the logical address assigned to each network device; and
   at least one additional network device electrically connected to the network bus after said bus controller has established communication with said initial set of network devices,
   wherein said bus controller is capable of assigning a logical address to said additional network devices, wherein said bus controller after establishing communication wit the network devices of said initial set of network devices, transmits a query on the network bus to all network devices at substantially the same time requesting that additional network devices connected to the network bus not having an assigned logical address respond to said bus controller, and thereafter said bus controller assigns logical addresses to each of said additional network devices tat do not currently have an associated logical address,
   wherein the logical address for each network device is assigned based on a unique aspect of the network device, wherein said bus controller initially assigns a unique logical address to each network device of said set of initial network devices, and wherein said bus controller after establishing communication with said set of initial network devices, assigns a logical address to said additional network device subsequently connected to the bus network based on a unique aspect of said additional network device.

2. A system according to claim 1, wherein the network devices afraid initial set of network devices and said additional network device have an associated manufacturing identifier based partially on the geographic location where the network device was manufactured, and wherein said bus controller assigns logical addresses to the network device of said initial set of network devices and said additional network device based on the manufacturing identifier associated with each network device.

3. A system according to claim 2, wherein the network devices of said initial set of network devices and said additional network device have an associated type identifier based on a function of the network device) wherein said bus controller assigns logical addresses to each of said initial set of network devices and said additional network device based on both the manufacturing identifier and the type identifier associated with the network devices.

4. A system according to claim 3, wherein said bus controller segments possible logical addresses to assign to the network devices into categories based on possible different types of network devices, and wherein said bus controller, for each network device of said initial set of network devices and for said additional network device, assigns a logical address to said network device from the category of logical addresses corresponding to the type identifier associated with the network device.

5. A system for establishing communication over a network bus comprising:
   an initial set of network devices in electrical communication with the network bus, wherein each of the network devices of said initial set of network devices has an assigned logical address identifying the network devices on the network bus;

a bus controller in electrical communication with the network bus for establishing communication with network devices connected to the network bus using the logical address assigned to each network device; and at least one additional network device electrically connected to the network bus after said bus controller has established communication with said initial set of network devices, wherein said bus controller is capable of assigning a logical address to said additional network devices, wherein said bus controller after establishing communication with the network devices of said initial set of network devices, transmits a query on the network bus to all network devices at substantially the same time requesting that additional network devices connected to the network bus not having an assigned logical address respond to said bus controller, and thereafter said bus controller assigns logical addresses to each of said additional network devices that do not currently have an associated logical address, wherein each of said additional network devices initially has a common null address prior to connection to the network bus, and wherein said bus controller after establishing communication with the network devices of said initial set of network devices, transmits a query on the network bus requesting that additional network devices connected to the network bus still having an associated common null address respond to said bus controller, and thereafter said bus controller replaces the common null address associated with each of said additional network devices with a logical address.

6. A system according to claim 1, wherein each of the network devices of said initial set of network devices and said additional network device initially have a common null address prior to connection to the network bus, and wherein after said network devices have been connected to the network bus and assigned a logical address, if said network device is disconnected from the network bus, said network device replaces the assigned logical address with the common null address.

7. A system for establishing communication over a network bus comprising:

an initial set of network devices in electrical communication with the network bus, wherein each of the network devices of said initial set of network devices has an assigned logical address identifying the network devices on the network bus;

a bus controller in electrical communication with the network bus for establishing communication with network devices connected to the network bus using the logical address assigned to each network device; and at least one additional network device electrically connected to the network bus after said bus controller has established communication with said initial set of network devices, wherein said bus controller is capable of assigning a logical address to said additional network devices, wherein said bus controller after establishing communication with the network devices of said initial set of network devices, transmits a query on the network bus to all network devices at substantially the same time requesting that additional network devices connected to the network bus not having an assigned logical address respond to said bus controller, and thereafter said bus controller assigns logical addresses to each of said additional network devices that do not currently have an associated logical address, wherein said bus controller communicates with network devices connected to the network bus according to an command schedule, wherein after said bus controller has established communication with said initial set of network devices according to the command schedule, if said additional network device is connected to the network bus, said bus controller continues communication with said initial set of network devices based on the command schedule and assigns a logical address to said additional network device during predefined pauses in the command schedule.

8. A system for establishing communication over a network bus comprising:

an initial set of network devices in electrical communication with the network bus, wherein each of the network devices of said initial set of network devices has an assigned logical address identifying the network devices on the network bus;

a bus controller in electrical communication with the network bus for establishing communication with network devices connected to the network bus using the logical address assigned to each network device; and at least one additional network device electrically connected to the network bus after said bus controller has established communication with said initial set of network devices, wherein said bus controller is capable of assigning a logical address to said additional network devices, wherein said bus controller after establishing communication with the network devices of said initial set of network devices, transmits a query on the network bus to all network devices at substantially the same time requesting that additional network devices connected to the network bus not having an assigned logical address respond to said bus controller, and thereafter said bus controller assigns logical addresses to each of said additional network devices that do not currently have an associated logical address, wherein said bus controller communicates with network devices connected to the network bus according to an command schedule, wherein after said bus controller has established communication with said initial set of network devices according to the command schedule, if said additional network device is connected to the network bus, said bus controller postpones communication with the network devices, assigns a logical address to said additional network device, and resumes the command schedule.

9. A system for establishing communication over a network bus comprising:

an initial set of network devices in electrical communication with the network bus, wherein each of the network devices of said initial set of network devices has an assigned logical address identifying the network devices on the network bus;

a bus controller in electrical communication with the network bus for establishing communication with network devices connected to the network bus using the logical address assigned to each network device; and at least one additional network device electrically connected to the network bus after said bus controller has established communication with said initial set of network devices, wherein said bus controller is capable of assigning a logical address to said additional network devices, wherein said bus controller after establishing communication with the network devices of said initial set of network devices, transmits a query on the network bus to all network devices at substantially the same time requesting that additional network devices connected to the network bus not having an assigned logical address respond to said bus controller, and thereafter said bus controller assigns logical addresses to each of said additional network devices that do not currently have an associated logical address, wherein said bus controller communicates with network devices connected to the network bus according to an command schedule, wherein said additional network device includes an associated type identifier based on a function of the network device, and wherein after said bus controller has established communication with said initial set of network devices according to the command schedule, if said additional network device is connected to the network bus, said bus controller assigns a logical address to said additional network device and adds said additional network device to the command schedule based on the type identifier associated with the additional network device.

10. A method for establishing communication between a bus controller and network devices via a network bus comprising the steps of:

communicating between the bus controller and an initial set of network devices connected to the network bus, wherein each of the network devices of the initial set of network devices has an assigned logical address identifying the network device on the network bus;

connecting at least one additional network device to the network bus after said communicating step has commenced communication between the bus controller and the initial set of network devices; and assigning a logical address to the additional network device added in said connecting step such that the additional network device can be identified on the network bus, wherein said assigning step comprises after said communicating step has commenced communication with the network devices of the initial set of network devices the step of transmitting a query on the network bus to all network devices at substantially the same time requesting that additional network devices connected to the network bus not having an assigned logical address respond, and thereafter automatically arid independent of user input assigning logical addresses to each of the additional network devices that do not currently have an associated logical address, wherein the logical address for each network device is assigned based on a unique aspect of the network device, wherein said assigning step initially assigns a unique logical address to each network device of the set of initial network devices, and wherein said assigning going step assigns a logical address to the additional network device subsequently connected to the bus network by said connecting step based on a unique aspect of the additional network device.

11. A method according to claim 10, wherein the network devices of the initial set of network devices and the additional network device has an associated manufacturing identifier based partially on the geographic location where the network device was manufactured, and wherein said assigning step assigns logical addresses to the network devices of the initial set of network devices and the additional network device based on the manufacturing identifier associated with each network device.

12. A method according to claim 11, wherein the network devices of the initial set of network devices and the additional network device have an associated type identifier based on a function of the network device, wherein said assigning step assigns logical addresses to each of the initial set of network devices and the additional network device based on both the manufacturing identifier and the type identifier associated with the network devices.

13. A method according to claim 12 further comprising the step of segmenting possible logical addresses to assign to the network devices into categories based on the possible different types of network devices, and wherein said assigning step, for each network device of the initial set of network devices and for the additional network device, assigns a logical address to the network device from the category of logical addresses corresponding to the type identifier associated with the network device.

14. A method for establishing communication between a bus controller and network devices via a network bus comprising the steps of:

communicating between the bus controller and an initial set of network devices connected to the network bus, wherein each of the network devices of the initial set of network devices has an assigned logical address identifying the network device on the network bus;

connecting at least one additional network device to the network bus after said communicating step has commenced communication between the bus controller and the initial set of network devices; and assigning a logical address to the additional network device added in said connecting step such that the additional network device can be identified on the network bus, wherein said assigning step comprises after said communicating step has commenced communication with the network devices of the initial set of network devices the step of transmitting a query on the network bus to all network devices at substantially the same time requesting that additional network devices connected to the network bus not having an assigned logical address respond, and thereafter automatically and independent of user input assigning logical addresses to each of the additional network devices that do not currently have an associated logical address, wherein each of the additional network devices connected in said connecting step initially has a common null address prior to connection to the network bus, wherein said transmitting step transmits a query on the network bus requesting that additional network devices connected to the network bus still having an associated common null address respond to said bus controller, and thereafter said assigning step replaces the common null address associated with each of the additional network devices with a logical address.

15. A method according to claim 14 further comprising the step of replacing the logical address assigned to a network device with the common null address if the network device is disconnected from the network bus.

16. A method according to claim 10, wherein said communicating step communicates between the bus controller and the network devices connected to the network bus according to an command schedule, wherein after said communication step has established communication between the bus controller and the initial set of network devices according to the command schedule, if said connecting step connects an additional network device to the network bus, said communicating step continues communication with the initial set of network devices based on the command schedule and said assigning step assigns a logical address to the additional network device during predefined pauses in the command schedule.

17. A method according to claim 10, wherein said communicating step communicates between the bus controller and the network devices connected to the network bus according to an command schedule, wherein after said communication step has established communication between the bus controller and the initial set of network devices according to the command schedule, if said connecting step connects an additional network device to the network bus, said communication step postpones communication with the network devices, and said assigning step assigns a logical address to the additional network device.

18. A method according to claim 10, wherein said communicating step communicates between the bus controller and the network devices connected to the network bus according to an command schedule, wherein the additional network device bas an associated type identifier based on a function of the network device, and wherein after said communication step has established communication between the bus controller and the initial set of network devices according to the command schedule, if said connecting step connects an additional network device to the network bus, said assigning step assigns a logical address to the additional network device adds the additional network device to the command schedule based on the type identifier associate with the additional network device.

19. A bus controller for establishing communication with network devices via a network bus using a logical address assigned to each network device, wherein said bus controller is capable of establishing communication with an initial set of network devices connected to the network bus each having an assigned logical address identifying the network device and thereafter assigning a logical address to at least one additional network device subsequently connected to the network bus, wherein said bus controller after establishing communication with the network devices of the initial set of network devices, transmits a query on the network bus to all network devices at substantially the same time requesting that additional network devices connected to the network bus riot having an assigned logical address respond to said bus controller, and thereafter said bus controller automatically and independent of user input assigns logical addresses to each of the additional network devices that do not currently have an associated logical address, wherein the logical address for each network device is assigned based on a unique aspect of the network device, wherein said bus controller initially assigns a unique logical address to each network device of the set of initial network devices, and wherein said bus controller after establishing communication with the set of initial network devices, assigns a logical address to the additional network device subsequently connected to the bus network based on a unique aspect of the additional network device.

20. A bus controller according to claim 19, wherein the network devices of the initial set of network devices and the additional network device have an associated manufacturing identifier based partially on the geographic location where the network device was manufactured, and wherein said bus controller assigns logical addresses to the network device of the initial set of network devices and the additional network device based on the manufacturing identifier associated with each network device.

21. A bus controller according to claim 20, wherein the network devices of the initial set of network devices and the additional network device have an associated type identifier based on a function of the network device, wherein said bus controller assigns logical addresses to each of the initial set of network devices and the additional network device based on both the manufacturing identifier and the type identifier associated with the network devices.

22. A bus controller according to claim 21, wherein said bus controller segments possible logical addresses to assign to the network devices into categories based on the possible different types of network devices, and wherein said bus controller, for each network device of the initial set of network devices and for the additional network device, assigns a logical address to the network device from the category of logical addresses corresponding to the type identifier associated with the network device.

23. A bus controller according to claim 19, wherein each of the additional network devices initially has a common null address prior to connection to the network bus, and wherein said bus controller after establishing communication with the network devices of the initial set of network devices, transmits a query on the network bus requesting that additional network devices connected to the network bus still having an associated common null address respond to said bus controller, and thereafter said bus controller replaces the common null address associated with each of the additional network devices with a logical address.

24. A bus controller according to claim 19, wherein said bus controller communicates with network devices connected to the network bus according to an command schedule, wherein after said bus controller has established communication with the initial set of network devices according to the command schedule, if an additional network device is connected to the network bus, said bus controller continues communication with the initial set of network devices based on the command schedule and assigns a logical address to the additional network device during predefined pauses in the command schedule.

25. A bus controller according to claim 19, wherein said bus controller communicates with network devices connected to the network bus according to an command schedule, wherein after said bus controller has established communication with the initial set of network devices according to the command schedule, Wan additional network device is connected to the network bus, said bus controller postpones communication with the network devices, assigns a logical address to the additional network device, and resumes the command schedule.

26. A bus controller according to claim 19, wherein said bus controller communicates with network devices connected to the network bus according to an command schedule, wherein the additional network device includes an associated type identifier based on a function of the network device, and wherein after said bus controller has established communication with the initial set of network devices according to the command schedule, if the additional network device is connected to the network bus, said bus controller assigns a logical address to the additional network device and adds the additional network device to the command schedule based on the type identifier associate with the additional network device.

* * * * *

UNITED STATES PATENT AND TRADEMARK OFFICE
CERTIFICATE OF CORRECTION

PATENT NO. : 7,111,100 B2
APPLICATION NO. : 10/475421
DATED : September 19, 2006
INVENTOR(S) : Ellerbrock It is certified that error appears in the above-identified patent and that said Letters Patent is hereby corrected as shown below:

Column 14,
Line 15, "wit" should read --with--;
Line 22, "tat" should read --that--;
Line 35, "afraid" should read --said--.

Column 17,
Line 45, "arid" should read --and--;
Line 54, cancel "going".

Column 19,
Line 20, "bas" should read --has--.

Column 20,
Line 47, "Wan" should read --if an--.

Signed and Sealed this

Twentieth Day of February, 2007

JON W. DUDAS
*Director of the United States Patent and Trademark Office*